United States Patent
Netzer et al.

(10) Patent No.: US 8,984,941 B2
(45) Date of Patent: Mar. 24, 2015

(54) TETHERED, LEVITATED-MASS ACCELEROMETER

(75) Inventors: Yishay Netzer, Yuvalim (IL); Oren Aharon, Rishon Lezion (IL); Michael Girgel, Kiriat Motzkin (IL)

(73) Assignee: Y-Sensors Ltd., D.N. Misgav (IL)

( * ) Notice: Subject to any disclaimer, the term of this patent is extended or adjusted under 35 U.S.C. 154(b) by 299 days.

(21) Appl. No.: 13/515,292

(22) PCT Filed: Dec. 16, 2010

(86) PCT No.: PCT/IB2010/055865
§ 371 (c)(1),
(2), (4) Date: Jun. 12, 2012

(87) PCT Pub. No.: WO2011/073935
PCT Pub. Date: Jun. 23, 2011

(65) Prior Publication Data
US 2012/0240679 A1    Sep. 27, 2012

Related U.S. Application Data

(60) Provisional application No. 61/284,197, filed on Dec. 16, 2009.

(51) Int. Cl.
*G01P 15/18* (2013.01)
*G01P 15/125* (2006.01)
*G01P 15/13* (2006.01)

(52) U.S. Cl.
CPC ............... *G01P 15/18* (2013.01); *G01P 15/125* (2013.01); *G01P 15/131* (2013.01)
USPC .......................... 73/514.18; 73/514.32; 73/510

(58) Field of Classification Search
CPC ... G01P 15/125; G01P 15/0802; G01P 15/18; G01P 15/131; G01P 15/0888; G01P 15/132
USPC ............... 73/514.32, 514.17, 514.18, 514.38, 73/510, 511
See application file for complete search history.

(56) References Cited

U.S. PATENT DOCUMENTS

| | | | |
|---|---|---|---|
| 5,473,946 A | 12/1995 | Wyse et al. | |
| 5,487,305 A * | 1/1996 | Ristic et al. | 73/514.32 |
| 5,806,365 A * | 9/1998 | Zunino et al. | 73/514.16 |
| 5,817,942 A | 10/1998 | Greiff | |
| 6,105,427 A | 8/2000 | Stewart et al. | |
| 6,158,280 A * | 12/2000 | Nonomura et al. | 73/504.04 |
| 6,666,092 B2 * | 12/2003 | Zarabadi et al. | 73/514.02 |
| 6,761,070 B2 * | 7/2004 | Zarabadi et al. | 73/514.32 |
| 6,848,304 B2 * | 2/2005 | Geen | 73/504.04 |
| 7,293,460 B2 * | 11/2007 | Zarabadi et al. | 73/514.32 |
| 7,934,423 B2 * | 5/2011 | Nasiri et al. | 73/514.02 |
| 8,056,415 B2 * | 11/2011 | McNeil et al. | 73/514.32 |
| 2003/0140699 A1 | 7/2003 | Pike et al. | |
| 2005/0097957 A1 | 5/2005 | McNeil et al. | |
| 2005/0274185 A1 | 12/2005 | Lo et al. | |
| 2008/0053228 A1 | 3/2008 | Pan et al. | |
| 2009/0100930 A1 * | 4/2009 | Coronato et al. | 73/504.12 |

* cited by examiner

*Primary Examiner* — Helen Kwok
(74) *Attorney, Agent, or Firm* — Mark M. Friedman

(57) ABSTRACT

A multi-axis force-balance accelerometer has a proof mass included within an enclosure. An electrically conductive tether, flexible in 6 degrees of freedom, provides a compliant electrically conductive link between the proof mass and the enclosure. Mechanical stops limit a range of motion of the proof mass. The enclosure includes captive plates and force balancing control loops for positioning the proof mass in a null position within the enclosure for each of the 3 rectilinear reference axes, and in a null position within the enclosure for each of 3 angular reference axes. The electrically conductive tether is sufficiently mechanically compliant that, on deactivation of the force balancing control loops for the rectilinear axes, the proof mass falls so as to rest on the mechanical stops.

6 Claims, 3 Drawing Sheets

TETHERED, LEVITATED-MASS ACCELEROMETER

BACKGROUND

Prior art force-balance accelerometers include a proof mass which is forced to the null of a position pickoff by means of a rebalancing force acting on the proof mass and opposing the force induced by the measured acceleration and, this force is proportional to the respective measured acceleration. In accelerometers fabricated using MEMS—(Micro-Electro mechanical System) technologies the balancing force is electrostatic and is generated by means of capacitive plates and/or comb drives. A typical prior art single axis accelerometer is illustrated by the cross section in FIG. 1 where a flexible hinge 1 constrains the movement of the proof mass 2 to rotation around a single axis. The proof mass movement is monitored by capacitive position-pickoff plates 3. The position pickoff has a null position which is also referred to as "electrical zero", similarly, the hinge zero deflection position is referred to as "mechanical zero". Ideally the electrical and mechanical zeroes coincide and no restoring force is generated by the hinge when the mass is constrained to the electrical zero. However, if there is an offset between the two zeroes then, even in the absence of acceleration, the balancing forces the mass the electrical zero will be opposed by the hinge to an extent which is proportional to the product of the offset and the hinge spring constant K. This parasitic force cannot be distinguished from inertial (acceleration) force and results in a measurement error. Such offset is practically unavoidable since the position pickoff zero and the electrical zero are differently influenced by temperature and long-term material instability. Therefore, the weaker the spring constant K the better is the temperature and time stability of the accelerometer. Stated differently, as the spring constant K. and the proof mass M constitute a mechanical resonator with natural frequency $\omega_0$ proportional to the square root of K/M this frequency should be lowered as much as possible.

The accelerometer FIG. 1 is an out-of-plane accelerometer since the proof mass is movable in a direction perpendicular the device plan, it is also referred to as hinged mass accelerometer (HMA). When implemented using MEMS technology the proof mass and hinge are integral and are made from single crystal silicon. The balancing force can be generated by the same capacitive plates 3 used as a position pickoff— see for example U.S. Pat. Nos. 5,473,946 5,006,487 and 6,105,427. To minimize its spring constant the hinge must be made as thin and as long as possible, however the practical length conflicts with the requirement of large proof mass which is required for high sensitivity. The result is a relatively short and thin hinge which is fragile and may not survive shocks. In-plane accelerometers are described in U.S. Pat. No. 6,817,942. FIG. 2 illustrates conceptually a typical in-plane accelerometers fabricated using a DRIE (Deep Reactive Ion Etching) process. Four slender springs 7 anchored at points 4 support the proof mass 6 and capacitive stationary plates 5 are interleaved with corresponding plates that extend from the proof mass to form a comb drive. Even though the springs can be made thin and long their width (the out-of-plane, Z dimension) is limited by the wafer thickness which by itself is limited by the DRIE fabrication technology. As a result, and unlike in FIG. 1 the hinge has a relatively low out-of-plane stiffness and deforms out of plane in response to Z-axis accelerations—which leads to cross-axis acceleration errors. These errors are caused both by the position pickoff and by the fact that the principal axis of the suspension becomes skewed relative to device plane.

A force-balance 3-axis accelerometer is described in reference [1] where the proof mass includes comb drives and capacitive plates for applying the forces in the X, Y and Z axes; the mass is suspended so as to minimize its rotational motions.

The concept of Levitated Mass Accelerometer (LMA) is also known. A simplified cross sectional view of a planar LMA described in references [2] and [3] with a round planar proof mass 10 is illustrated conceptually in FIG. 3. The figure also shows capacitive plates 8 that are used for generating actuation force on the proof mass and plates 9 for sensing its position in Z axis. However, in a planar LMA as in FIG. 3, the cross section of the planar proof mass is inadequate for generating significant in-plane (X-Y) electrostatic forces using reasonable voltages. The LMA in FIG. 3 is therefore passively centered in the X-Y plane using static electric field gradients rather than by force balancing loops as explained in reference [3] white only in the Z-axis is force-balanced to measure the respective acceleration. In contrast the proof mass of an Ideal 6 axis LMA should be constrained to the electrical zero position of each axis using a force-balance loops and the LMA be free from the shortcomings associated with mechanical hinges.

An error mechanism that affects any levitated proof mass but does not seem to have been recognized by prior art LMA, is due to parasitic electrostatic charge attracted to the levitated mass. Such charge is generated by surface contact between the proof mass and the enclosure prior to levitation and leads to parasitic forces that result in measurement errors. Since this charge is neither predictable nor repeatable from turn-on to turn-on, this error cannot be calibrated out. The present invention aims to provide the advantages of an ideal LMA without its parasitic charge deficiency, this is achieved by tethering the mass in a manner that substantially retains its mechanical freedom while at the same time providing an electric discharge path.

SUMMARY OF THE INVENTION

The present invention is illustrated conceptually by the cross sectional view in FIG. 4. It can be regarded as a modification to the levitated mass accelerometer wherein, instead of being fully free and electrically isolated, the proof mass is coupled by means of a flexible, electrically conductive tether that provides a discharge path. The tether is preferably made in the shape of a spiral and is very narrow and very long; it is thus purposely highly resilient in all directions to enable the proof mass to float as freely as possible. Because the tether is so flexible the mass falls down and rests on mechanical stops (not shown) when the system is in active, when activated the mass is held in place in the X, Y and Z axes by three force-balance loops which provide the respective accelerations. To keep the mass from rotating there are additional three force-balance loops that also provide the respective three angular accelerations.

DETAILED DESCRIPTION OF PREFERRED EMBODIMENTS

The present invention aims to provide the advantages of a Levitated Mass Accelerometer (LMA) while avoiding its disadvantages.

Figure 1:
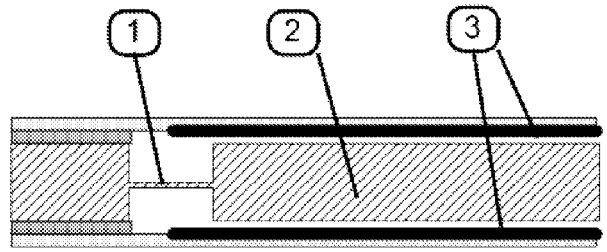
FIG. 1 illustrates a sectional view of an out-of-plane accelerometer.
Figure 2:
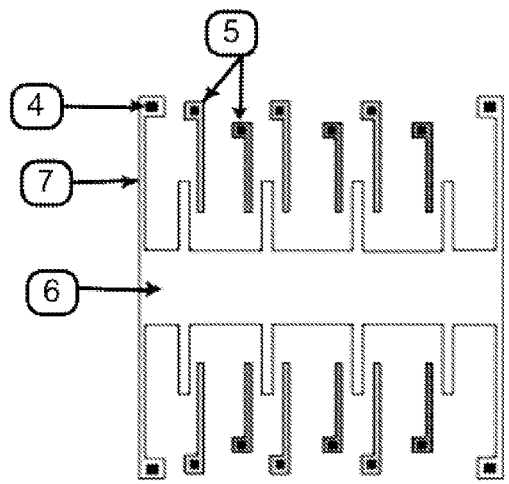
FIG. 2 illustrates a top view of an in-plane accelerometer.
Figure 3:
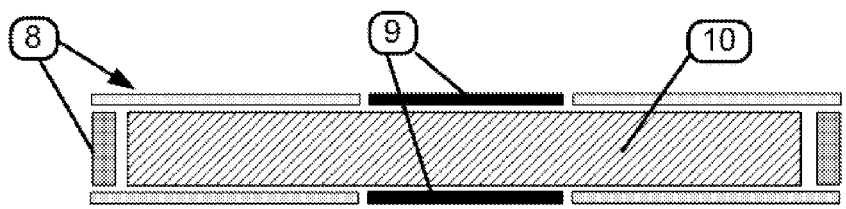
FIG. 3 illustrates a prior art planar levitated mass accelerometer.
Figure 4:
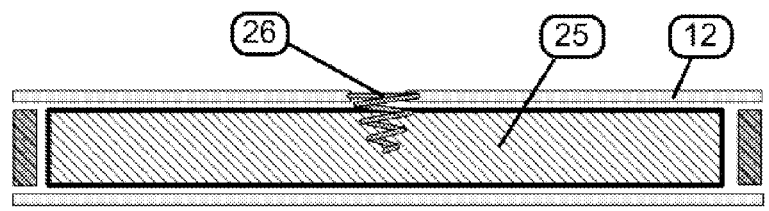
FIG. 4 illustrates a conceptual implementation of the present invention.

The accelerometer of the present invention as illustrated schematically in FIG. 4 includes a levitated, electrically conductive proof mass 25 that is linked by an electrically-conductive member 26 to a stationary enclosure 12. The purpose of the electrically-conductive member is to electrically connect to the proof mass and drain any parasitic electrostatic charge; apart from that it is made as compliant as practical in all 6 degrees of freedom, thus minimizing elastic mechanical force and torques acting on the proof mass.

Figure 5:
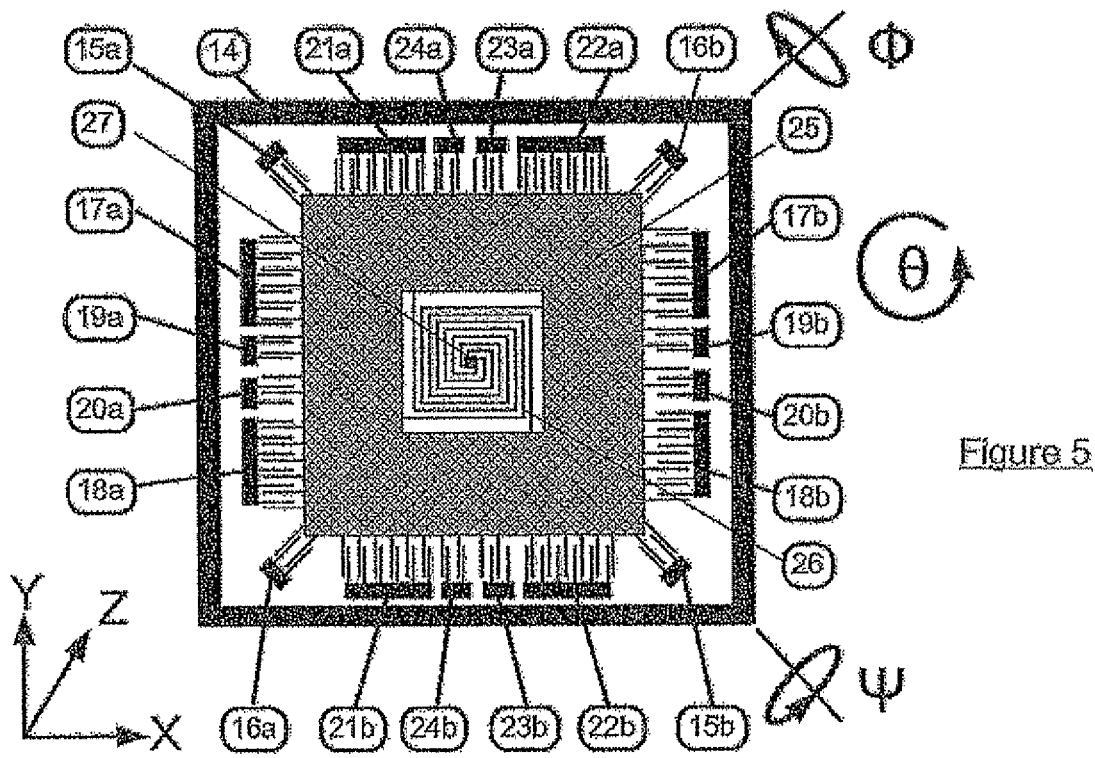
FIG. 5 illustrates the middle layer of an accelerometer according to the present invention.
Figure 6:
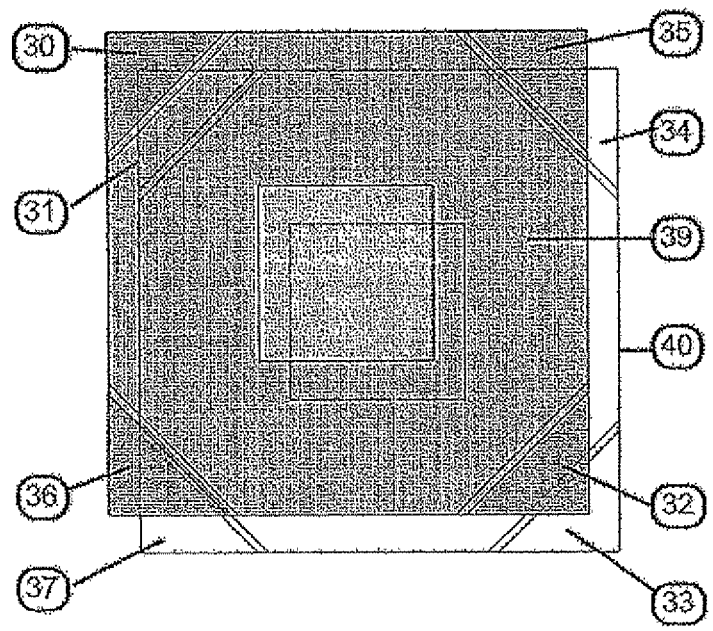
FIG. 6 illustrates the capacitive plates of the Z, φ and Ψ axes according to the present invention.

FIG. 6 illustrates a top view of the proof mass of an accelerometer according to a preferred implementation of the present invention in which the proof mass 25 is anchored to the stationary part of the accelerometer by means of one or more spirals 28 anchor region 27 and spacer 14. In the particular implementation illustrated in FIG. 5 there are four interlinked spirals, which are internal to the proof mass; however the invention can be implemented by using other number of spiral arms or by using other flexible linkages, such as serpentines. Furthermore, even though shown internal to the proof mass the flexible linkage, or linkages, could be placed external to it and supporting it at the edges.

Unlike in prior art accelerometer designs such as in reference [1], the flexible linkage is highly compliant in all 6 axes and can thus be regarded as a tether rather than a suspension. For this reason, 6 separate control loops are needed to hold the mass at the electrical zero of each of the measurement axes. In the preferred embodiment of the invention each control loop employs a differential capacitive position pickoff for sensing the respective position of the proof mass and a differential capacitive (electrostatic) actuator for generating the restoring force. This force-balance method of sensing and actuating is common in prior art and is well understood by those versed in the art. In the present invention the 3 rectilinear axes are referred to as X, Y and Z. The 3 angular axes are referred to as θ (around the Z axis), φ and Ψ (around axes in the X-Y plane).

Unlike in prior art planar LMA, forces are applied to the proof mass in the X and Y axes by means of capacitive (electrostatic) comb-drives. Comb drives 17a and 18a and their counterparts 17b and 18b on the opposite side of the proof mass are used for generating forces in the Y axis and comb drives 21a and 22a and their counterparts 21b and 22b on the opposite side are used for generating forces in the X axis. The comb drives, as opposed to facing planar plates, provide a large overall area between the facing stationary and moving capacitive plates in spite of the relatively small cross section of the proof mass. This enables the generation of relatively large lateral forces using relatively low voltages, i.e., larger accelerations can be measured without resorting to impractically high voltages. In a typical implementation, only 25 volts are needed to balance the inertial forces of 10 g acceleration. Sensing the position of the proof mass in the Y axis is done in this implementation by means of comb drives 19a, 20a and their counterparts 19b, 20b on the opposite side of the proof mass and in the X axis by comb drives 23a and 24a and their counterparts 23b and 24b on the opposite side of the proof mass. Preferably the stationary position pickoff combs of each axis are excited by voltages of different frequencies which are applied to the stationary combs the resulting individual currents are summed at point 27 which is connected to a current to voltage amplifier 45 in FIG. 8 and then separated and converted to voltages indicative of the displacements of the proof mass in the respective axes using synchronous demodulators and low-pass filters. This method of modulation-demodulation is well known to those versed in the art and will not be elaborated upon here for brevity.

FIG. 5 also illustrates comb pairs 15a, 15b which are similarly used for sensing rotational motion of the mass in the Θ axis (around the Z axis) and combs 16a, 16b used for generating the respective actuating torques. As explained further below the same pairs of combs can be used for both functions by using time multiplexing, In another implementation of the present invention various combinations of the X-Y combs such as 18a, 17b or 21a, 22b can be time multiplexed to generate rotational torques around the Z axis as well.

Figure 9:
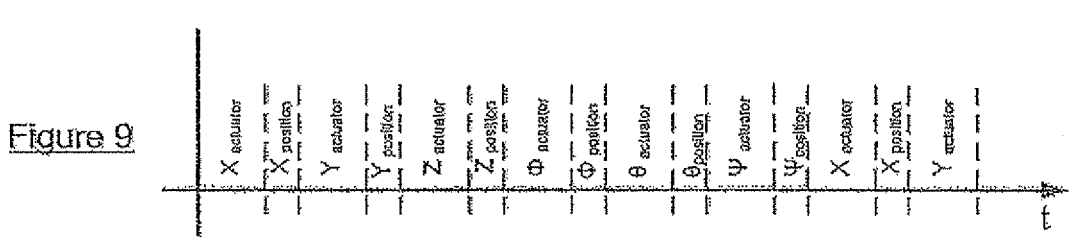
FIG. 9 illustrates an actuation/sensing sequence of a time multiplexed embodiment of the invention.

FIG. 6 illustrates the capacitive plates above and below the proof mass which serve the Z, φ and Ψ axes according to a preferred embodiment of the present invention. Plates 34, 36 serve the actuation function and pair 37, 36 serves the position pickoff function of the Ψ axis. Similarly, pairs 30, 33 and 32, 31 serve the φ axis. Each pair can be used either for sensing or for actuating or for both as described below. Plates 39, 40 belong to the Z axis. Each of plates 39, 40 can be split into two concentric areas (not shown) wherein one serves for the position pickoff and one for the actuator, however the unified plates as shown illustrate the option explained further below with reference to FIG. 9.

Figure 7:
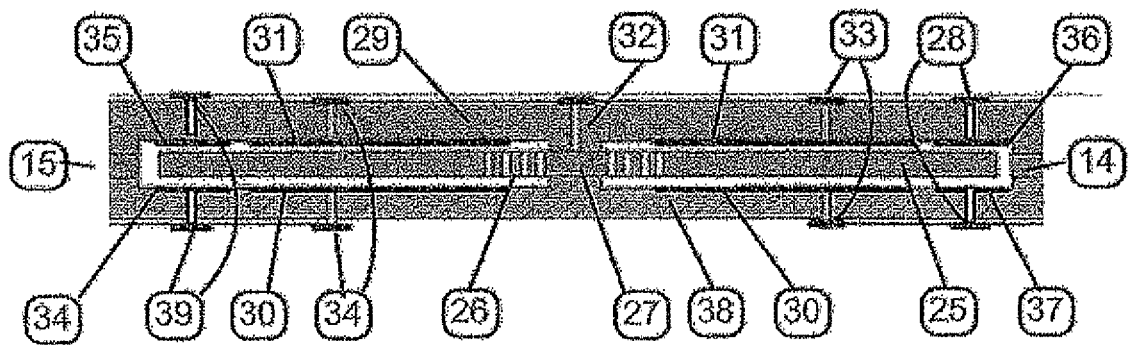
FIG. 7 illustrates a cross section of the preferred implementation of the present invention.

FIG. 7 illustrates a cross-section of the preferred embodiment of the invention across the Ψ axis diagonal, including a top substrate 29, a bottom substrate 38 and a middle layer (so called device layer) 29 which constitutes the proof mass 25 the spacer 14, the tether 26 and the anchor region 27. The anchor region connects the tether electrically through via 32 to the preamplifier 45 in FIG. 8. Vies 33 and 34 provide electrical connection to Z-axis capacitive plates 31 and 30 on the inside surfaces of the top and bottom substrate. Vias 28 and 39 provide electrical connection to φ axis plates 34, 35 and 36, 37.

Figure 8:
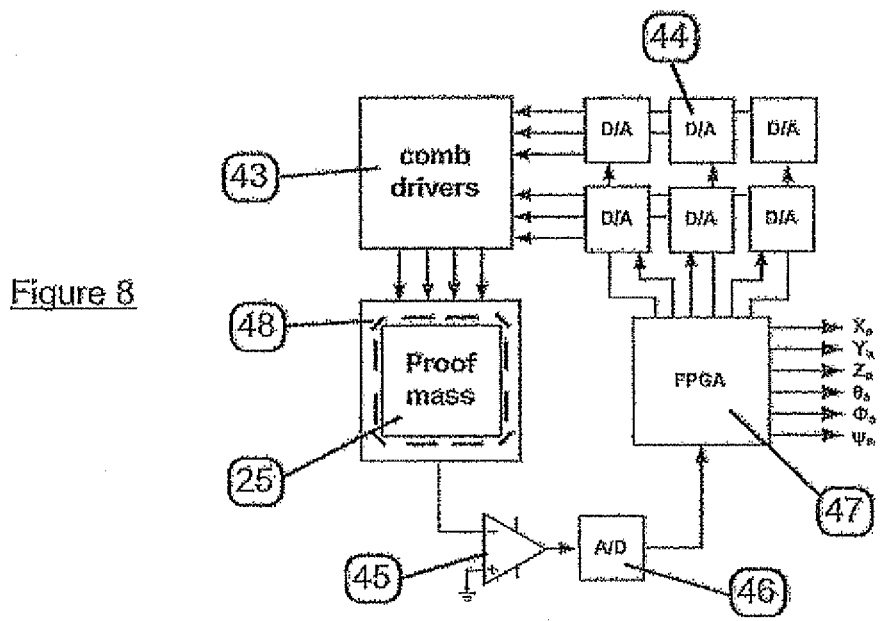
FIG. 8 illustrates a simplified control system for a six axis accelerometer according to a preferred embodiment of the invention

FIG. 8 is a simplified illustration of a force-balance control system according to a preferred embodiment of the present invention. Preamplifier 45 is connected to the proof mass 25; its output is digitized by A/D converter 46 and is processed by FPGA processor 47 which generates six analog command signals via six D/A converters 44, The analog command signals are applied to comb drivers 43 which apply voltages to the actuating combs as well as excitation signals to the position pickoff combs all shown collectively as 48.

An alternative method for sensing and actuating the proof mass is described in U.S. Pat. No. 5,473,946 in which the same capacitive plates are multiplexed between two modes; position sensing, and electrostatic (capacitive) actuating, the proof mass is connected to the input of a preamplifier followed by the processing electronics. A similar method can be used in the present invention to serve more than one axis as illustrated conceptually in FIG. 9. Since the amplifier can only serve a single function at any time and there are 6 pairs of capacitive plates the sensing/actuating sequence includes 6 pairs of time slots; one pair for each measurement axis. A disadvantage of this method is that, because of the forces in each axis are applied only a fraction of the time, higher actuating voltages are needed for the same measured acceleration.

The present invention can also be used for measuring acceleration in less than six axes. For example, the application may require the measurement of only the X, Y and Z accelerations, in this case the three angular force-balance loops would serve only to restrain the angular motion of the proof mass. Apparently this is similar to the 3-axis accelerometer in reference [1] in which the angular motion of the proof mass is restrained by mechanical suspensions. However, to restrain the proof mass angularly without resorting to force balancing the suspensions must be significantly stiffer compared to the tether in the present invention. This is evidenced by its resonant frequencies in the X, Y and Z axes which are higher than 5 kHz in the above reference. This conflicts with the requirement for low resonant frequency as described in the background above. In contrast the corresponding resonant frequencies in a typical implementation of the present invention are around 50 Hz, i.e., 100 times lower.

REFERENCES

[1] A 3-Axis Force-balanced Accelerometer Using a Single Proof-Mass, M. A. Lemkin, B. E Boser, D. Auslander, and J. H. Smith, 1997 International Conference on Solid-State Sensors and Actuators, Chicago, Ill., June 16-19, 1997, Vol. 2, pp. 1185-1188

[2] Levitated Micro-accelerometer—Sandia Report SAND2004-2284, June 2004

[3] Analysis and Design of a Capacitive Accelerometer Based on a Electrostatically Levitated Micro-disk Ruth Houlihan a, Arena Kukharenka, Mircea Southampton SO17 1BJ, UK.

The invention claimed is:

1. A multi-axis force-balance accelerometer including 3 rectilinear reference axes X, Y and Z and 3 angular reference axes $\theta$, $\Phi$, and $\Psi$, the accelerometer comprising:
   a) an enclosure having a null position in each of said 3 rectilinear reference axes and in each of said 3 angular reference axes,
   b) a proof mass included inside said enclosure and movable relative to each of said 3 rectilinear reference axes and each of said 3 angular reference axes,
   c) at least one electrically conductive tether which is flexible in 6 degrees of freedom constituting an electrically conductive link between said proof mass and said enclosure, and
   d) mechanical stops for limiting a range of motion of said proof mass from said null position,
   said enclosure including a plurality of capacitive plates for sensing the position of said proof mass relative to the null position in each of said 3 rectilinear reference axes and in each of said 3 angular reference axes and for applying electrostatic forces on said proof mass along each of said 3 rectilinear reference axes and for applying electrostatic torques on said proof mass around each of said 3 angular reference axes,
   said accelerometer including 3 force balancing control loops for positioning said proof mass in said null position for each of said 3 rectilinear reference axes, and 3 force balancing control loops for positioning said proof mass in said null position for each of said 3 angular reference axes,
   and wherein said electrically conductive tether is mechanically compliant such that, on deactivation of said force balancing control loops for said 3 rectilinear reference axes, said proof mass falls so as to rest on said mechanical stops.

2. An accelerometer as in claim 1 wherein said tether includes at least one spiral.

3. A planar accelerometer as in claim 1 fabricated using micromechanical technologies and comprising:
   a) a top layer;
   b) an intermediate device layer; and
   c) a bottom layer,
   said top and bottom layers being spaced apart to constitute at least part of said enclosure, said proof mass and said tether being fabricated by etching the device layer, the inner surfaces of said bottom and top layers include a plurality of capacitive plates employed for sensing a position of the proof mass within said enclosure,
   wherein a first end of said tether extends from the proof mass and a second end of the tether extends from at least one of said top and bottom layers.

4. An accelerometer as in claim 3 wherein the capacitive plates that serve the X and Y and $\theta$ axes are capacitive (electrostatic) comb drives formed within said intermediate device layer.

5. An accelerometer as in claim 1 wherein the flexible tether includes at least one serpentine member.

6. An accelerometer as in claim 1 wherein the flexible tether is the sole mechanical connection between said proof mass and said enclosure when said proof mass is at said null position, and wherein the flexible tether is attached to said enclosure at only one region of attachment.

* * * * *